April 14, 1936.
C. H. FREESE
2,037,571
CONTROL OF PLUGGING
Filed June 30, 1934
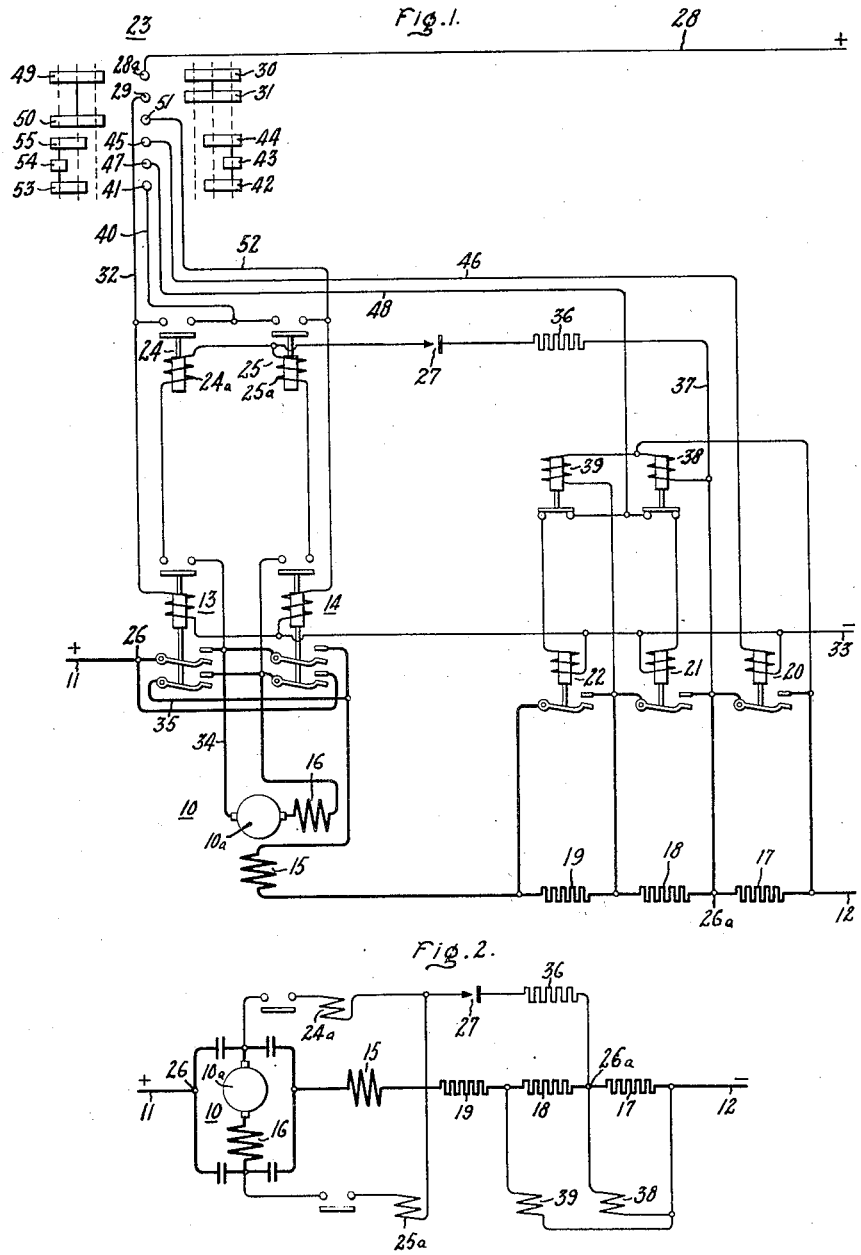
Inventor:
Clyde H. Freese, Deceased
by Ruth Rodkey Freese, Executrix
by Harry E. Dunham
Attorney Patented Apr. 14, 1936

2,037,571

UNITED STATES PATENT OFFICE 2,037,571

CONTROL OF PLUGGING

Clyde H. Freese, deceased, late of Niskayuna, N. Y., by Ruth Rodkey Freese, executrix, Niskayuna, N. Y., assignor to General Electric Company, a corporation of New York Application June 30, 1934, Serial No. 733,284

12 Claims. (Cl. 172—179)

This invention relates to control systems, more particularly to systems for controlling the operation of electric motors, and it has for an object the provision of a simple, reliable and improved system of this character.

More specifically the invention relates to systems for controlling the reverse power braking operation of an electric motor. This operation is generally referred to as "plugging" the motor. In this specification, the terms "plugging" and "reverse power braking" are used interchangeably. A motor is plugged when the armature is rotating in one direction and potential is applied which tends to cause the motor armature to rotate in the opposite direction. A direct current motor may be plugged either by reversing the potential on the field or the armature. When a motor is plugged, a powerful braking torque is exerted and for this reason plugging is frequently used as a means decelerating the motor and its load.

Normally the counter-voltage of a motor opposes the line voltage, and therefore, limits the motor current to a relatively low value. However, when the motor is plugged, its counter-voltage is reversed, and becomes additive to the line voltage. If the motor is plugged when operating at full speed, the resultant voltage, i. e., the sum of the line and counter-voltages, tends to cause an abnormal current to flow which is many times the normal full load current. Means must be provided for limiting this current to a safe value. The resistor used for starting and accelerating the motor from rest can be reinserted at the instant of plugging to assist in limiting the current and torque to safe values. However, the amount of resistance required for starting and accelerating is usually much less than the amount required to limit the plugging current to a safe value when the motor is plugged at relatively high speed. For that reason, an additional section of resistance, usually referred to as the plugging section, is connected in series with the starting resistor, and the total resistor is inserted when the motor is plugged. Since the plugging section of resistance is in addition to that ordinarily required for starting and accelerating, it is desirable to control this section in such a manner that it will be included in the motor circuit when the motor is plugged until the motor is decelerated to a predetermined low speed but will be short circuited immediately when the motor is started from rest. The plugging section of resistance is commonly controlled by a contactor known as the plugging contactor.

Heretofore, control systems have been utilized in which the operation of the plugging contactor was controlled in response to a voltage drop in a motor circuit which voltage drop was the resultant of the counter-voltage of the motor and an IR voltage drop in the motor circuit. These systems possessed the disadvantage that they frequently caused fluttering, i. e., rapid opening and closing of the plugging contactor during plugging. This fluttering action was produced by a reversal of polarity of this resultant voltage drop at the instant the plugging contactor closed. This fluttering, of course, delayed the braking action and resulted in unnecessary wear of the plugging contactor and associated apparatus. Accordingly, a more specific object of the invention is the provision of a system for controlling the plugging operation of an electric motor in which fluttering action of the plugging contactor is eliminated.

A further object of the invention is the provision of a motor plugging control system in which means are provided for preventing the short-circuiting of the plugging resistor before the speed of the motor is sufficiently diminished, in response to a resultant voltage drop across that portion of the motor circuit utilized for controlling the plugging contactor.

A still further object of the invention is the provision of a control system of this character, in which the speed range, due to variation in line voltage, within which the plugging contactor closes is made very narrow and the stability of operation proportionately increased.

In carrying the invention into effect in one form thereof, means are provided for establishing plugging connections for an electric motor with a plugging resistor included in these connections. Means responsive to a predetermined resultant voltage-drop across a certain portion of the motor circuit are provided for short-circuiting the plugging resistor when the speed of the motor is sufficiently decreased, and means are also provided for preventing the short-circuiting means from responding to a voltage drop across this portion of the motor circuit after plugging and before the speed of the motor has been sufficiently reduced.

For a better and more complete understanding of this invention, reference should now be had to the following specification and to the accompanying drawing in which Fig. 1 is a simple diagrammatical illustration of an embodiment of the invention and Fig. 2 is a further simplified diagrammatic illustration in "across the line" form of the system of Fig. 1.

Referring now to the drawing an electric motor 10 is supplied from a suitable source illustrated in the drawing by the two supply lines 11 and 12 to which the motor may be connected by suitable means, such as the electromagnetic contactors 13 and 14. Although the motor 10 may be of any suitable type, it is shown for the purposes of illustration as a series type direct current motor provided with a series field winding 15 and a series commutating winding 16. When the contactor 13 is operated to its closed position, it connects the motor to the supply source for operation in the forward direction, whilst when the contactor 14 is closed, the motor is connected to the source for rotation in the reverse direction.

For the purpose of limiting the motor current to safe values, suitable current limiting means are provided. These means are illustrated as comprising a resistance having a section 17 connected in the motor circuit for limiting the motor current during the plugging operation and additional portions 18 and 19 connected in the motor circuit between the plugging section 17 and the motor for limiting the motor current during starting and acceleration of the motor. The inclusion of the resistance sections in the motor circuit and the short-circuiting of these resistance sections are effected by suitable means such as electromagnetic contactors 20, 21 and 22 for controlling the resistance sections 17, 18 and 19 respectively. The contactor 20, which controls the plugging section 17 of the resistance is usually referred to as the plugging contactor, whilst the contactors 21 and 22 which control the accelerating portions 18 and 19 of the resistance are known as accelerating contactors. As shown in Fig. 1, the plugging contactor 20 is jointly under the control of a reversing multi-position master control switching device 23 and a pair of control relays 24 and 25 referred to as the forward plugging relay and the reverse plugging relay respectively. It will be observed that the operating coils 24a and 25a of the plugging relays 24 and 25 are connected in parallel with each other in an energizing circuit that extends from a point 26 on the line side of the motor armature to a point 26a at the junction between the plugging portion 17 and the accelerating portion 18 of the resistance in the motor circuit. Thus, the energizing circuits of the plugging relays 24 and 25 are connected across the motor armature and the accelerating portions 18 and 19 of the resistance with the result that the operation of these relays is responsive to the voltage drop across this portion of the motor circuit, which voltage drop is the result of the counter-voltage of the motor and the IR drop of this portion of the circuit itself. In plugging control systems used heretofore, the plugging resistance has usually been connected in the motor circuit between the motor and the accelerating sections of the resistance whilst the energizing circuits of the plugging relays have been connected across the motor and the plugging section of the resistance. Short circuit of the plugging section of the resistance in these systems produced a large change in the voltage drop across the motor and the accelerating portion of the resistance. If this short-circuiting occurred before the motor came to rest and while operating at a substantial speed, as was frequently the case, the polarity of the voltage drop across this portion of the motor circuit was actually reversed with the result that the plugging contactor was deenergized and opened and the plugging section of the resistance reinserted in the motor circuit. Thereafter, the closing and opening of the plugging relay was rapidly repeated until the speed of the motor was reduced substantially to zero. This fluttering or pounding action of the contacts of the plugging relays and plugging contactor resulted in unnecessary wear and, therefore, shortened the life of these parts. In addition, the braking action of the motor was delayed.

However, with the connections illustrated in the drawing, it will be seen that this fluttering or pounding action is eliminated because when the plugging sections 17 of the resistance is short circuited, the energizing circuits of the plugging relays are connected directly across the line.

The plugging relays are so designed and constructed that they close their contacts to energize the plugging contactor when a voltage drop of a predetermined critical value exists across the motor and the accelerating portions of the resistance. When the voltage drop is less than this value the plugging relays are open. Therefore, when the motor is plugged, the resultant voltage drop across the motor and accelerating portions of the resistance should be less than this critical value so that the plugging contactor will be open and the plugging resistance included in the motor circuit when it is most needed. However, the ohmic value of the plugging section 17 of the resistance is usually many times greater than the ohmic value of the accelerating portions and consequently if the motor is plugged while operating at a very high speed, the resultant voltage drop across the motor and the accelerating portions of the resistance will be sufficient to cause the plugging relays to close the plugging contactor and short circuit and render the plugging section of the resistance ineffective at a time when its inclusion for the purpose of limiting the motor current is most urgent. Under these circumstances the polarity of the voltage drop across the motor and accelerating portions of the resistance is reversed with respect to the polarity of the voltage drop that exists across this portion of the motor circuit when the speed of the motor and its counter voltage are reduced to low values. Therefore, in order to prevent the short-circuiting of the plugging sections 17 of the resistance before the speed of the motor has been reduced to a sufficiently low value, rectifying means 27 are included in the energizing circuit of the plugging relays to prevent the response of these relays to any voltage drop appearing across the motor and the accelerating portions of the resistance at the instant of plugging.

Although any suitable type of rectifying device may be utilized, preferably an inexpensive plate surface contact type rectifying device, such for example as the copper oxide rectifying device conventionally illustrated in the drawing, is employed. It will be understood, however, that any other suitable form of rectifying device may be utilized instead.

With the above understanding of the elements and their organization in the completed system, the operation of the system itself will readily be understood from the following description. With the system in the normally deenergized condition in which it is illustrated in the drawing, the motor 10 is started in the forward direction by operating the master switching device 23 to its first operating position for the forward direction of rotation. In this position of the master switch 23, the energizing circuit is established for the operating coil of the forward contactor 13. This circuit is traced from the positive supply line 28 through stationary fingers 28a and 29 bridged by the connecting segments 30 and 31, conductor 32, operating coil of forward contactor 13 to the negative supply line 33. The supply source 28, 33 may be and preferably is the same as that represented by the supply lines 11, 12. In response to the energization of its operating coil, the contactor 13 closes its main and auxiliary contacts. The closing of the main contacts of the contactor 13 completes a circuit for the motor 10 that is traced from the side 11 of the supply source (assumed positive), upper main contacts of the contactor 13, conductor 34, armature 10a, commutating field 16, lower main contact of contactor 13, conductor 35, series field winding 15, resistance sections 19, 18 and 17 in the order named to the negative side 12 of the supply source. The auxiliary contacts of the contactor 13, in their closed position, complete an energizing circuit for the operating coil 24a of the plugging relay 24 that is readily traced from the point 26 through upper main contacts of the contactor, closed auxiliary contacts of the contactor, coil 24a of the plugging relay, rectifying device 27, resistance 36, conductor 37 to the junction point 26a between the plugging and acceleration portions of the resistance. Thus the operating coil of the forward plugging relay 24 is energized by the voltage drop across the motor and the accelerating circuits 18 of the resistance. The rectifying device 27 is connected in such a manner that it allows current to flow in the energizing circuit of the forward plugging relay in the direction indicated by the arrow. As a result, the plugging relay 24 closes its contacts and partially completes an energizing circuit for the operating coil of the plugging contactor 20. Thus it will be seen that the closing of the auxiliary contacts of the forward contactor 13 establishes connections which allow the plugging relay 24 to become energized and to close its contacts when the motor 10 is at rest or when it is rotating in the direction of its torque.

As shown in the drawing, the energizing circuits of the accelerating contactors 21 and 22 are respectively controlled by the accelerating relays 38 and 39. The operating coil of the accelerating relay 38 is connected across the plugging section 17 of the resistance, whilst the operating coil of the accelerating relay 39 is connected across the accelerating section 18 of the resistance. As a result of the voltage drop across the resistance section 17, the operating coil of the relay 38 is energized and its contacts are opened. Similarly in response to the voltage drop across the resistance section 18, the operating coil of relay 39 is energized and its contacts are also opened. As a result, the energizing circuits of the accelerating contactors 21 and 22 are interrupted so that these contactors cannot be closed at this moment.

Operation of the master switch 23 to its second forward position completes the energizing circuit for the operating coil of the plugging contactor 20. This circuit is readily traced from the conductor 32 (connected through the master switch to the side 28 of the supply source) through the previously closed contacts of the plugging relay 24, conductor 40, finger 41, connected segments 42, 43, 44, finger 45, conductor 46, operating coil of plugging contactor 20 to the negative side 33 of the supply source. The plugging contactor 20 closes in response to energization of its operating coil and short circuits the plugging section 17 of the resistance. The accelerating relays 38 and 39 are preferably of the type shown in Figs. 2 and 3 of U. S. Patent No. 1,720,623, Carichoff et al. Relays of this type have a time delay in their operation owing to the closed magnetic structure with which they are provided. This closed magnetic structure produces a slow decay of the magnetic flux thereby resulting in the desired time delay operation. Consequently, the short circuiting of the plugging section 17 of the resistance also short circuits the operating coil of the accelerating relay 38. As a result of the short circuiting of its operating coil, the flux in the magnetic structure of the relay 38 decays at a rate which depends upon the setting of the adjusting member (not shown) so that the contacts of the relay remain open for a time interval. At the end of this time interval, the flux has decayed sufficiently to allow the contacts of the relay to close and complete an energizing circuit for the operating coil of the accelerating contactor 21, provided that the switch 23 has by this time been operated to its third position. Assuming the master switch 23 in its third forward position, the energizing circuit for the operating coil of the accelerating relay 21 is traced from the segment 43 (previously connected with the side 28 of the supply source) to the finger 47 with which it is in engagement, conductor 48, previously closed contacts of accelerating relay 38, operating coil of auxiliary contactor 21 to the negative side 33 of the supply source. Accelerating contactor 21 closes in response to the energization of its operating coil and short-circuits the accelerating section 18 of the resistance and also short-circuits the operating coil of the accelerating relay 39. Since the structure of the relay 39 is the same as that of the relay 38, its contacts will close after a time interval and complete an energizing circuit for the operating coil of the accelerating contactor 22. This energizing circuit is the same as that previously traced for the operating coil of the contactor 21 as far as the conductor 48. From this conductor, the energizing circuit is completed through the closed contacts of the relay 39 through the operating coil of the accelerating contactor 22 to the negative side 33 of the supply source.

It will be understood that the short-circuiting of the accelerating portions 18 and 19 of the resistance results in accelerating the motor and its load to full speed.

Now assuming that the motor is operating at full speed and that it is desired to plug the motor quickly to rest, this operation is accomplished by operating the master switch 23 in the reverse direction. The operator usually accomplishes this operation in a single complete movement, quickly throwing the master switch from the full speed forward position to the full speed reverse position. As the master switch is moved from the third forward position to the second forward position, the energizing circuits of the accelerating contactors 21 and 22 are interrupted, and these contactors open their contacts to insert the resistance sections 18 and 19 in the motor circuit. Similarly, as the master switch is moved from its second forward to its first forward position, the energizing circuit of the plugging contactor 20 is opened, as a result of which this contactor opens its contacts and inserts the plugging sections 17 of the resistance of the motor circuit. In like manner as the master switch 23 is moved to its central position, the energizing circuit of the forward contactor 13 is opened and this contactor opens its main contacts disconnecting the motor from the supply source and also opens its auxiliary contacts interrupting the energizing circuit of the forward plugging relay 24.

In the first reverse position of the master switch 23, an energizing circuit is completed for the operating coil of the reverse contactor 14. This energizing circuit is readily traced from the finger 23a to the power segment 49 in engagement with segment 50 and finger 51, conductor 52, operating coil of reverse contactor 14 to the negative side of the supply line 33. The contactor 14 closes in response to the energization of its operating coil and thus connects the motor 10 to the line for rotation in the reverse direction. This causes a large current to flow in the motor circuit which produces a voltage drop across the resistance sections 17 and 18 of sufficient magnitude to energize the operating coils of the accelerating relays 38 and 39. As a result, these relays open their contacts and interrupt the energizing circuit of the accelerating contactors 21 and 22 so that these contactors cannot be closed to short circuit their respective resistance sections at this time.

When the motor was connected to the line for rotation in the forward direction, its counter-voltage opposed the voltage of the source. Since the connection of the motor to the line is now reversed, the counter-voltage of the motor and the line voltage add to each other and thus the sum of the line voltage and the motor voltage is applied across the resistance sections 17, 18 and 19. Since, as previously pointed out, the resistance of the sections 18 and 19 is small as compared with that of the section 17 and since the greater portion of the sum of these two voltages is consumed in the voltage drop across the resistance section 17, it will be seen that the potential of the point 26a will be much greater, i. e., more positive than the potential of the point 26 on the line side of the motor circuit, or the positive side 11 of the supply source. If the motor is plugged while operating at high speed, the resultant voltage across the motor and accelerating portions 18 and 19 of the resistance will be of sufficient magnitude to cause the plugging relay 25 to respond and close its contacts to complete an energizing circuit for the operating coil of the plugging contactor 20. This operation, of course, would cause the plugging contactor to close its contacts and short-circuit the plugging section 17 of the resistance at a time when it is most needed to limit the motor current. With the counter-voltage of the motor adding to the line voltage instead of opposing it and with the plugging section 17 of the resistance short-circuited, the motor current, limited only by the accelerating sections 18 and 19 would rise to an abnormal value many times that of the full load current of the motor. However, since the junction point 26a between the plugging and accelerating sections of the resistance is more positive than the point 26 on the line side of the motor, current tends to flow through the operating coil 25a of the plugging relay 25 in a direction which is the reverse of that in which current can flow through the rectifier 27. Therefore, no current flows in the energizing circuit of the plugging relay 25 in response to the resultant voltage drop across the motor and the accelerating resistance portion at the instant of plugging and thus the plugging section 17 of the resistance is not short-circuited at this time when it is most needed.

However, a large braking current is caused to flow through the resistance sections 17, 18 and 19 as a result of which the speed of the motor is rapidly decreased. As the speed and counter-voltage of the motor are decreased the potential of the junction point 26a becomes less positive with respect to the point 26 until at some intermediate speed, the potentials of the points 26 and 26a become equal. Further decrease in the speed and counter-voltage of the motor 10 causes the potential of the junction point 26a to become negative with respect to the potential of the point 26 on the line side of the motor and consequently the rectifier 27 now allows current to flow through the operating coil 25a of the plugging contactor 25 in the direction indicated by the arrow. At some predetermined low speed of the motor, preferably, at substantially zero speed, the resultant voltage drop across the motor and accelerating sections 18 and 19 of the resistance is of sufficient magnitude to cause the plugging relay 25a to close its contacts and to complete an energizing circuit for the operating coil of the plugging contactor 20. In this connection, it was assumed that the master switch 23 was thrown from the full speed forward to the full speed reverse position. Consequently, the energizing circuit for the plugging contactor is completed from the power segment 49 to the segment 50, finger 51, conductor 52, closed contacts of plugging relay 25, conductor 40, finger 41, segment 53 in engagement therewith, segments 54 and 55, finger 45, conductor 46, operating coil of plugging contactor 20 to the negative side 33 of the supply source. The plugging contactor closes in response to energization and short-circuits the plugging section 17 of the resistance. It will be observed that when the plugging section 13 of the resistance is short-circuited, the operating coil 25a of the plugging relay is connected directly across the supply source 11, 12. Consequently, the change in resultant voltage drop across the motor and accelerating sections 18 and 19, due to short-circuiting of the plugging section does not affect the energization of the plugging relay and consequently fluttering and pounding action of the contacts is eliminated.

Thereafter, the accelerating contactors 21 and 22 are closed to short-circuit the accelerating portions 18 and 19 in a manner that is substantially identical with that already described in connection with the starting of the motor from rest in the forward direction.

Although in accordance with the provision of the patent statutes this invention is described as embodied in concrete form, it will be understood that the apparatus and connections shown are merely illustrative and that the invention is not limited thereto, since alterations and modifications will readily suggest themselves to persons skilled in the art without departing from the true spirit of the invention or from the scope of the annexed claims.

What is claimed as new and desired to be secured by Letters Patent of the United States, is:

1. A control system comprising an electric motor, means for establishing reverse power braking connections for said motor, means for limiting the braking current of said motor, an electroresponsive device having an energizing circuit connected to be responsive to a predetermined voltage drop in the circuit of said motor for rendering said current limiting means ineffective, and means connected in said energizing circuit for preventing operation of said device in response to a voltage drop of reverse polarity in said motor circuit upon establishment of said braking connections.

2. A control system comprising an electric motor, means for establishing reverse power braking connections for said motor, a resistance connected in the motor circuit having a portion for limiting the motor current during said braking operation and a portion for controlling the acceleration of said motor, a device responsive to a predetermined voltage drop across said motor and a portion of said resistance for rendering said braking current limiting portion ineffective, and means for preventing operation of said device in response to a voltage drop of reverse polarity when said braking operation is initiated and providing for operation of said device upon decrease in the speed of said motor and reversal of polarity of the voltage drop across said motor and said portion of said resistance.

3. A control system comprising an electric motor, means for establishing plugging connections to brake said motor, means for limiting the motor current during said plugging operation, means connected in the motor circuit between said current limiting means and said motor for controlling the acceleration thereof, means responsive to a predetermined voltage drop across said motor and acceleration controlling means for short circuiting said plugging current controlling means, and means for preventing operation of said short circuiting means in response to a voltage drop of reverse polarity across said motor and acceleration controlling means upon establishment of said plugging connections.

4. A motor control system comprising an electric motor, means for establishing plugging connections to brake said motor, a resistor in said motor circuit for limiting the motor current during said plugging operation, an additional resistor included in said motor circuit between said plugging resistor and motor for controlling the acceleration of said motor, means responsive to a predetermined voltage drop across said motor and additional resistor for short circuiting said plugging resistor and means for preventing unintended operation of said short-circuiting means in response to a voltage drop of reverse polarity across said motor and accelerating resistor upon establishment of said plugging connections and providing operation of said short-circuiting means upon decrease of the countervoltage of said motor to a predetermined low value.

5. A motor control system comprising an electric motor, means for establishing plugging connections to brake said motor, a resistor in the motor circuit for limiting the motor current during said plugging operation, an additional resistor in said motor circuit between said plugging resistor and motor for controlling the acceleration of said motor, an electroresponsive device responsive to a predetermined voltage drop across said motor and additional resistor for short-circuiting said plugging resistor, and means for preventing operation of said device in response to a voltage drop of reverse polarity in said circuit when said motor is plugged and providing for operation of said device upon decrease in the speed of said motor and reversal of the polarity of voltage drop across said motor and additional resistor.

6. A control system comprising an electric motor, means for establishing plugging connections to brake said motor, a resistor in the motor circuit for limiting the plugging current to a safe value, an additional resistor for controlling the acceleration of said motor connected in the motor circuit between said plugging resistor and said motor, an electro-responsive relay having an energizing winding connected across said motor and accelerating resistor and responsive to a predetermined voltage drop across said motor and accelerating resistor for controlling the short-circuiting of said plugging resistor and rectifying means connected in said energizing circuit for controlling the energization of said relay.

7. A control system comprising an electric motor, directional switching means for plugging said motor, a resistance device connected in the motor circuit having a portion for limiting the motor plugging current and a portion connected between said plugging portion and said motor for controlling the acceleration of said motor, a pair of relays for controlling the short circuiting of said plugging portion, circuit connections controlled by said directional switching means for selectively activating said relays in dependence upon the direction of energization of said motor, and rectifying means included in said circuit connections for preventing energization of said relays in response to the voltage drop across said motor and accelerating portion when said motor is plugged and providing for operation of one of said relays after reversal of the polarity of said voltage drop as the counter voltage of said motor decreases.

8. A motor control system comprising an electric motor, means for establishing reverse power braking connections for said motor, means for limiting the braking current of said motor, an electroresponsive device having an energizing circuit connected to be responsive to a predetermined voltage drop in the circuit of said motor for rendering said current limiting means ineffective whereby said voltage drop is varied, means comprising connections from said voltage drop responsive device to said motor circuit for preventing operation of said device to render said current limiting means effective in response to said variation in said voltage drop and means connected in said energizing circuit for preventing energization of said device in response to a voltage drop of reverse polarity when said braking connections are established.

9. A controller for an electric motor connected to a source of supply, switching means for establishing plugging connections of said motor to said source, a resistor in the motor circuit having a portion for limiting the plugging current of said motor and an additional portion connected between said plugging portion and said motor, an electro-responsive device responsive to a predetermined voltage drop across said motor and a portion of said resistor for short-circuiting said plugging portion whereby a change in said voltage drop is effected, said electro-responsive device having an energizing circuit connected across said motor and additional resistance portion so that when said plugging portion is short-circuited, said device is connected to said source and a one-way conducting device connected in circuit with said electro-responsive device for controlling the operation thereof in accordance with the polarity of said voltage drop across said motor and said portion of said resistor.

10. In a controller for an electric motor connected to a source of supply, switching means for establishing plugging connections of said motor to said source, a plugging resistance for limiting the motor current during plugging, an electro-responsive device having an energizing circuit connected across a portion of the motor circuit including said motor and responsive to a predetermined voltage drop across said portion for short-circuiting said resistance, and rectifying means in said energizing circuit for preventing response of said device to a voltage drop of reverse polarity.

11. In combination, an electric motor, means comprising a master switching device and electromagnetic reversing contactors controlled thereby for establishing plugging connections of said motor to a source of supply, a resistance having a portion connected in the motor circuit for limiting the motor plugging current and an additional portion connected in said motor circuit between said plugging portion and motor for controlling the acceleration of said motor, a relay responsive to a predetermined voltage drop in said motor circuit for short-circuiting said plugging portion, said relay having its energizing circuit connected across said motor and accelerating portion so that when said plugging portion is short-circuited, said relay is connected to said source, and rectifying means connected in said energizing circuit for preventing response of said relay to voltage drop of reverse polarity when said plugging connections are established.

12. In a control system, an electric motor, a master switch and a pair of contactors controlled thereby for establishing plugging connections of said motor to a source of supply, a resistance device connected in the motor circuit, having a portion for limiting the plugging current of the motor and a portion connected between said plugging portion and said motor for controlling the acceleration of said motor, a pair of relays arranged for selective actuation depending on the direction of energization of said motor, said relays being responsive to a predetermined voltage drop in said motor circuit for short-circuiting said plugging portion and having their energizing circuits connected across said motor and accelerating portion, and rectifying means in said energizing circuits for preventing false operation of said relays due to reversal of polarity of the voltage drop across said motor and accelerating portion.

RUTH RODKEY FREESE,
*Executrix of the Estate of Clyde H. Freese, Deceased.*